United States Patent Office 2,962,504
Patented Nov. 29, 1960

2,962,504
PRODUCTION OF MALEIC ANHYDRIDE DERIVATIVES

George Henry Francis Walker and Frank Raymond Bradbury, Widnes, England, assignors to Imperial Chemical Industries Limited, London, England, a corporation of Great Britain No Drawing. Filed Dec. 12, 1957, Ser. No. 702,232

Claims priority, application Great Britain Dec. 19, 1956

6 Claims. (Cl. 260—326.5)

The present invention relates to improvements in or relating to the production of derivatives of maleic anhydride and more particularly to the production of N-substituted halomaleimides of the general formula

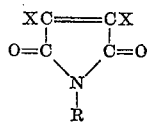

where X can be Cl or Br and R can be an aliphatic, an aromatic and an alicyclic group.

Compounds of this type are often prepared by the condensation of an amine with a halomaleic anhydride as for example dichloromaleic anhydride. It has been usual to carry out such a condensation under fairly severe conditions i.e. at temperatures in the range 140–160° C. in suitable solvents, or by fusing the reactants together. For example, N-phenyl dichloromaleimide may be prepared by adding aniline to dichloromaleic anhydride in trichlorobenzene at 150° and heating at this temperature for 25 minutes.

Furthermore although it is known that diiodomaleic acid can be reacted with, for example aniline in glacial acetic acid to give N-phenyl diiodomaleimide, nevertheless great care has to be taken in the carrying out of this reaction because diiodomaleic acid when heated with aniline in glacial acetic acid also forms phenyl aminomaleyl phenylimide. Also it is known that when diiodo maleic acid is heated with para-toluidine in glacial acetic acid, para-tolyl aminomaleyl para-tolylimide is obtained and not N-para-tolyl diiodomaleimide.

We have found that it is possible readily to condense dichloromaleic anhydride and dibromomaleic anhydride with aliphatic, alicyclic and aromatic primary amines under relatively gentle conditions if glacial acetic acid is used as the solvent.

According to the present invention the process for the production of an N-substituted halomaleimide of the general formula

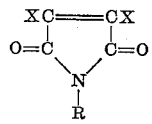

where X can be Cl or Br, and R can be an aliphatic, an aromatic and an alicyclic group comprises condensing in solution in glacial acetic acid a maleic anhydride of the general formula

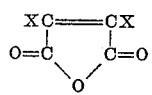

where X can be Cl or Br with an aliphatic, an aromatic or an alicyclic primary amine.

The maleic anhydride may be for example dichloromaleic anhydride or dibromomaleic anhydride and the primary amine may be for example p-toluidine, n-butylamine or cyclohexylamine.

If desired the said solution in glacial acetic acid may contain a dehydrating agent as for instance acetic anhydride or phosphorus pentoxide.

For instance the dichloromaleic anhydride is conveniently dissolved in glacial acetic acid and a solution of the amine in glacial acetic acid added with stirring. Sometimes it may be convenient to add the amine directly and not in solution. The dichloromaleic anhydride solution may be added to the amine solution, if desired.

By glacial acetic acid is meant an acetic acid having an acetic acid content at least approaching 100%, that is to say an acetic acid having an acetic acid content of for instance 95–100%. Where high yields of pure products are desired the glacial acetic acid should usually have an acetic acid content between 98% and 100%.

The mixture can be brought to the required temperature for the reaction in various ways, such as warming one or both of the components of the mixture before mixing and controlling the rate of addition to make use of the heat of reaction or by warming the mixture obtained. The mixture is maintained at the required temperature till the product separates in crystalline form or it may be precipitated by cooling, or by adding water if necessary.

The choice of temperature may depend on the product required. It has been found, for instance, for the reaction of dichloromaleic anhydride with p-toluidine and also with n-butylamine, that at temperatures in the range 80° C. to 118° C. (which is the boiling point of glacial acetic acid of 100% acetic acid content) a yield of over 75% of the pure product may be obtained. Often at temperatures in the region of 75° C. a less pure product may be separated which is slightly acidic and of somewhat lower melting point. However, as the products produced according to the process of this invention are suitable for the preparation of fungicidal compositions, this cruder product may often be sufficiently pure for commercial use. Thus where it is desirable to obtain the product in a form which requires little purification it is preferable to work at temperatures in the range 80° C. to 118° C., and where a crude material is a suitable product, to work at a temperature in the region of 75° C. The choice of product depends on a balance between the purpose for which it is to be used and the cost of production.

Besides having a convenient boiling point, acetic acid appears to have some specific virtue as a solvent for this reaction. Thus we have found that using solvents such as trichlorobenzene or other chlorobenzenes at such temperatures as 70–80° C. no yield of a suitable product is obtained, and at temperatures in the range 140°–160° C., the yields are much lower than those obtained by carrying out the condensation in glacial acetic acid.

Also it has not proved possible to prepare the cycloaliphatic derivatives, for example N-cyclohexyl dichloromaleimide, by condensing the appropriate primary amine and halomaleic anhydride in trichlorobenzene, at 140–160° C. whereas moderate yields have been obtained by condensation in glacial acetic acid at the boiling point in accordance with the process of the present invention.

The following compounds prepared by the process of the invention are new compounds: N-cyclohexyl dichloromaleimide, N-butyl dichloromaleimide, N-p-tolyl dibromomaleimide, and N-cyclohexyl dibromomaleimide.

The following examples illustrate the invention.

*Example 1*

N-p-tolyl dichloromaleimide is prepared as follows.

A solution of 26.75 grams of p-toluidine in 100 cc. of glacial acetic acid is added to a stirred solution of 41.75 grams of dichloromaleic anhydride in 200 cc. of glacial acetic acid at a temperature of 77° C. When the addition is completed the temperature is allowed to rise to 80° C. The mixture is maintained at this temperature for twelve minutes. The product precipitates and after cooling is filtered at the pump, washed with ether and dried. A yield of 78.1% is obtained of N-p-tolyl dichloromaleimide which melts at 193–194° C.

*Example 2*

N-butyl dichloromaleimide is prepared as follows.

A solution of 18.25 grams of n-butylamine in 50 cc. of glacial acetic acid is added to a solution of 41.75 grams of dichloromaleic anhydride in 150 cc. of glacial acetic acid at 100° C. When the addition is completed, the temperature is raised to and maintained at 118° C. for twenty minutes. The reaction mixture is cooled and poured into ice water when a light brown solid is precipitated. This product is filtered, washed with ether and dried. A yield of 82.9% of N-butyl dichloromaleimide melting at 38–41° C. is obtained.

*Example 3*

N-cyclohexyl dichloromaleimide is prepared as follows.

A solution of 10 grams of cyclohexylamine in 50 cc. of glacial acetic acid is added to a solution of 16.7 grams of dichloromaleic anhydride in glacial acetic acid at 100° C. When the addition is completed, the temperature is raised to and maintained at 118° C. for twenty minutes. The solution is cooled and a light brown solid is precipitated when the cooled solution is poured into cold water. This product is filtered off, recrystallised twice from methyl alcohol and dried. A yield of 33% of N-cyclohexyl dichloromaleimide melting at 143° C. is obtained.

*Example 4*

N-phenyl dibromomaleimide is prepared as follows.

A solution of 4.7 grams of aniline in 50 cc. of glacial acetic acid is added to a stirred solution of 12.8 grams of dibromomaleic anhydride in 50 cc. of glacial acetic acid at 100° C. Heating is continued under reflux for one hour after the addition of the solution of aniline. The reaction mixture is then allowed to cool to room temperature and to stand for 18 hours. The light orange crystals which are formed are filtered off and are washed with petrol ether and dried. The melting point of the crude product thus obtained is 159°–160° C. After recrystallisation from alcohol the melting point of the N-phenyl dibromomaleimide is 164° C. The yield of recrystallised product is 55.4%.

*Example 5*

N-p-tolyl dibromomaleimide is prepared as follows.

A solution of 5.4 grams of p-toluidine in 50 cc. of glacial acetic acid is added to a stirred solution of 12.8 grams of dibromomaleic anhydride in 50 cc. of glacial acetic acid at 100° C. Heating is continued under reflux for one hour after the addition of the solution of p-toluidine. The reaction mixture is then allowed to cool to room temperature. The light yellow crystals which are formed are filtered off and washed with petrol ether and dried. The melting point of the crude product thus obtained is 170°–171° C. After recrystallisation from alcohol the melting point of the N-p-tolyl dibromomaleimide is 174° C. The yield of the recrystallised product is about 50%.

*Example 6*

N-cyclohexyl dibromomaleimide is prepared as follows.

A solution of 4.95 grams of cyclohexylamine in 50 cc. of glacial acetic acid is added to a solution of 12.8 grams of dibromomaleic anhydride in 50 cc. of glacial acetic acid at 100° C. Heating is continued at 100° C. for one hour after the addition of the solution of cyclohexylamine. The reaction mixture is allowed to cool and the light brown crystals thus obtained are filtered off. A quantity of a sticky solid deposit is also obtained when the mother liquor is diluted with water. This product on digestion with hot alcohol gives a crystalline product of the same melting point as the afore-mentioned light brown crystals, namely, 162–165° C. These two crystalline products of melting point 162–165° C. are combined and recrystallised from alcohol. The yield of N-cyclohexyl dibromomaleimide, melting point 167–168° C. thus obtained is less than 30%.

The following compounds have also for example been produced by the process of the invention: N-alpha naphthyl dichloromaleimide, N-beta naphthyl dichloromaleimide, N-3.4-dichlorophenyl dichloromaleimide, N-2.3-dichlorophenyl dichloromaleimide, N-2.4-dichlorophenyl dichloromaleimide, N-2.5-dichlorophenyl dichloromaleimide, N-2.4.6-trichlorophenyl dichloromaleimide, N-2-chloro-4-nitrophenyl dichloromaleimide, N-2-nitro-4-chlorophenyl dichloromaleimide, N-2.4-dimethyl phenyl dichloromaleimide, N-2.6-dimethyl phenyl dichloromaleimide, N-n-amyl dichloromaleimide, N-iso amyl dichloromaleimide, N-2-ethyl hexyl dichloromaleimide and N-n-hexyl dichloromaleimide.

What we claim is:

1. A process as claimed in claim 6 wherein the primary amine is p-toluidine.

2. A process as claimed in claim 6 wherein the primary amine is n-butylamine.

3. A process as claimed in claim 6 wherein the primary amine is cyclohexylamine.

4. A process as claimed in claim 6 wherein said solution in glacial acetic acid contains a dehydrating agent selected from the group consisting of acetic anhydride and phosphorus pentoxide.

5. A process as claimed in claim 6 wherein the temperature of condensing in solution in glacial acetic acid is in the region of 75° C.

6. A process for the production of an N-substituted halomaleimide of the general formula

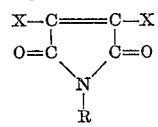

where X is selected from the group consisting of Cl and Br and R is a radical derived from a primary amine selected from the group consisting of aliphatic, aromatic and alicylic primary amines, which comprises condensing in solution in glacial acetic acid within a temperature range of about 75° to 118° C. a maleic anhydride selected from the group consisting of dichloromaleic anhydride and dibromoaleic anhydride with the appropriate primary amine $RNH_2$.

References Cited in the file of this patent

UNITED STATES PATENTS

| | | |
|---|---|---|
| 2,205,558 | Flett | June 25, 1940 |
| 2,686,774 | D'Alelio | Aug. 17, 1954 |
| 2,726,981 | Wolf et al. | Dec. 13, 1955 |
| 2,898,266 | Gates | Aug. 4, 1959 |

OTHER REFERENCES

Clarke et al.: J. Am. Chem. Society, vol. 36 (1914), pp. 1901–1906.